United States Patent [19]
Dykstra

[11] Patent Number: 5,628,441
[45] Date of Patent: May 13, 1997

[54] CONTAINER HOLDER

[75] Inventor: Ronald A. Dykstra, Grandville, Mich.

[73] Assignee: Prince Corporation, Holland, Mich.

[21] Appl. No.: 378,470

[22] Filed: Jan. 26, 1995

[51] Int. Cl.⁶ .................................................. B60R 7/00
[52] U.S. Cl. ........................ 224/483; 224/926; 248/311.2
[58] Field of Search ................................. 224/483, 482,
224/926; 296/37.12, 37.13, 37.8; 248/311.2;
D7/701, 708; D12/419, 420

[56] References Cited

U.S. PATENT DOCUMENTS

| D. 128,124 | 7/1941 | Melville . |
| D. 294,531 | 3/1988 | Neunzig . |
| D. 299,771 | 2/1989 | Kennedy . |
| D. 307,824 | 5/1990 | Warren . |
| D. 311,105 | 10/1990 | Stern et al. . |
| D. 311,869 | 11/1990 | Carlson . |
| D. 353,082 | 12/1994 | Keven . |
| D. 360,396 | 7/1995 | Collins . |
| D. 363,698 | 10/1995 | Smith ....................... D12/419 |
| 4,721,216 | 1/1988 | Kinder . |
| 4,809,897 | 3/1989 | Wright, Jr. . |
| 4,989,742 | 2/1991 | Powell . |
| 5,071,002 | 12/1991 | Bradley ................. 248/311.2 X |
| 5,217,193 | 6/1993 | Drucker ................. 248/311.2 X |
| 5,275,779 | 1/1994 | Marfilius et al. . |
| 5,326,064 | 7/1994 | Sapien ......................... 224/926 |

FOREIGN PATENT DOCUMENTS 1115669  1/1982  Canada .................................. 224/926

Primary Examiner—Renee S. Luebke
Attorney, Agent, or Firm—Price, Heneveld, Cooper, DeWitt & Litton

[57] ABSTRACT

A container is provided for a support having an upper that is generally flat, such as in a van console or an armrest. The container holder includes a pair of offset overlapping recesses which have different diameters and depths, such that one of the recesses is adapted to receive a coffee mug having a handle with the handle extending into the second recess, and the second recess is configured to support a smaller diameter soda can or the like.

11 Claims, 3 Drawing Sheets

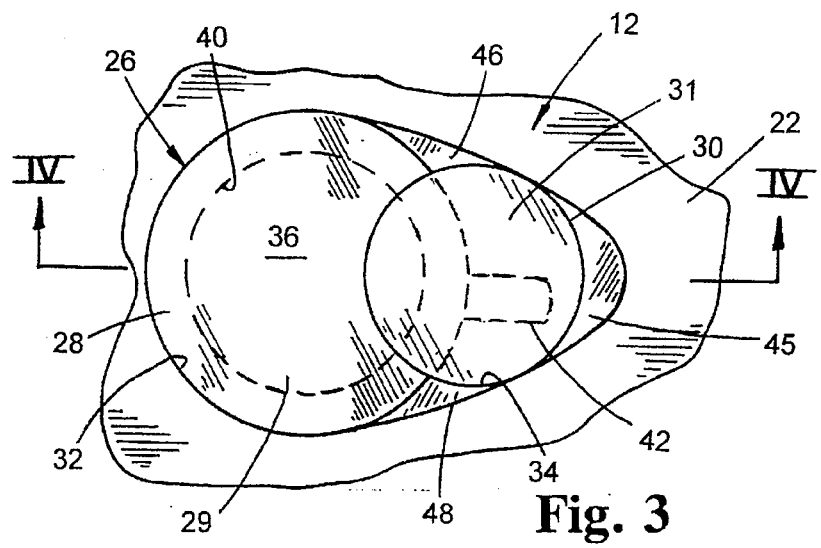
Fig. 3
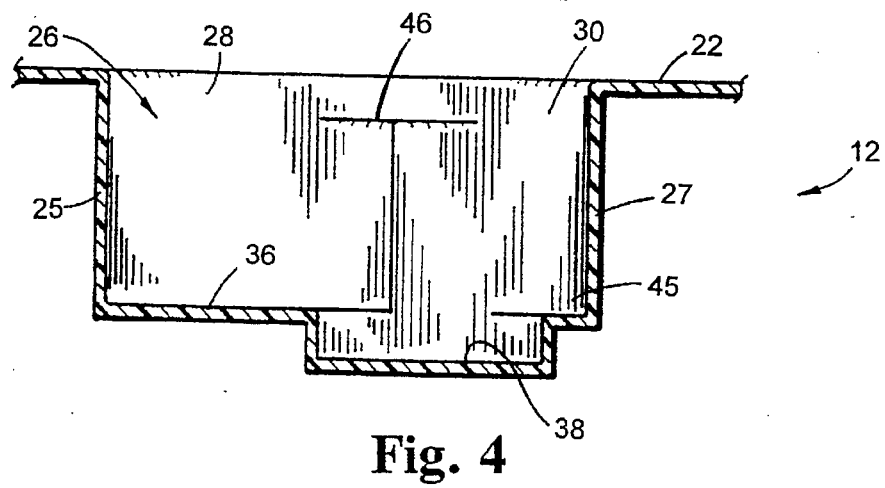
Fig. 4
Fig. 5
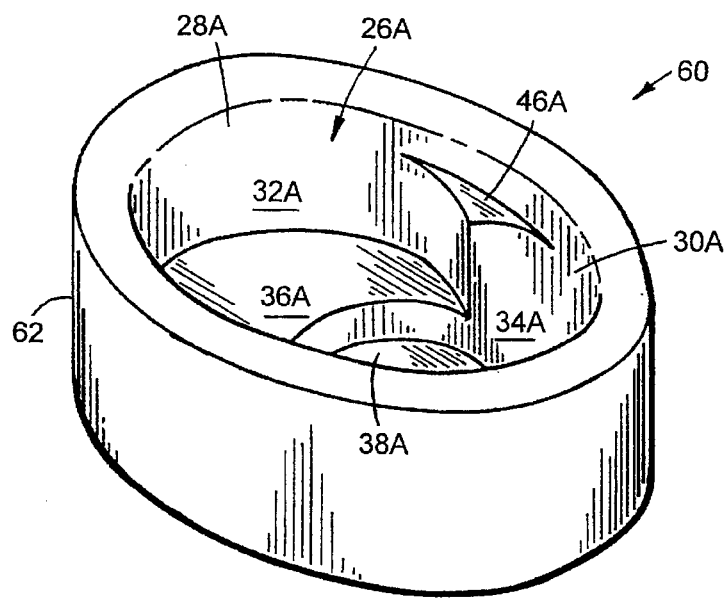

ns 46 and 48 at their intersection that project inwardly
CONTAINER HOLDER

BACKGROUND OF THE INVENTION

The present invention relates to a container holder for a vehicle, and more particularly concerns a container holder for holding different sized and shaped containers.

It is not uncommon for occupants of vehicles to carry open beverage containers, such as cups of coffee or soda cans, in the vehicles. However, beverage containers are of different shapes and sizes, and it is impossible to predict the shape and size container that a passenger will use. This make it difficult to construct a single container holder for holding the variety of different containers used. At the same time, the space in vehicle passenger compartments is limited, such that it is not possible or practical to provide multiple customized container holders for every different container size.

Some container holders have been designed with moving parts to receive containers having different shapes and sizes. However, the moving parts make the container holders more expensive and complex than desired, and also may break and add to warranty or repair expense. Further, some multiple container holders with moving parts do not match the interior decor of the vehicle passenger compartment. Thus, it is desirable to provide a vehicle container holder adapted to securely hold containers having different shapes and sizes, but which conserves space, has no moving parts, and is aesthetically pleasing.

SUMMARY OF THE INVENTION

The present invention includes a container holder for a vehicle having a support with an upper surface and at least one recess defined in the upper surface. The recess includes a first side surface defining a first container holder aperture and a second side surface defining a second container holder aperture, which apertures are offset and overlap so that one aperture provides space for a handle on a container placed in the other. In a preferred form, the first container holder aperture is a first diameter configured to support a coffee mug with a handle of the mug extending into the second container holder, and the second container holder is a second different diameter configured to support a container such as a soda can or a coffee cup. The floor of the recess in a preferred embodiment defines vertically offset sections associated with the first and second apertures.

These and other features, advantages and objects of the present invention will be further understood and appreciated by those skilled in the art by reference the following specification, claim and appended drawings.

BRIEF DESCRIPTION OF THE DRAWINGS

FIG. 3 is a fragmentary, top plan view of the container holder shown in FIG. 2;

FIG. 4 is a fragmentary cross-sectional view taken along section line IV—IV in FIG. 3;

FIG. 5 is a perspective view of an alternative embodiment of a container holder embodying the present invention;

DETAILED DESCRIPTION OF PREFERRED EMBODIMENT

Figure 1:
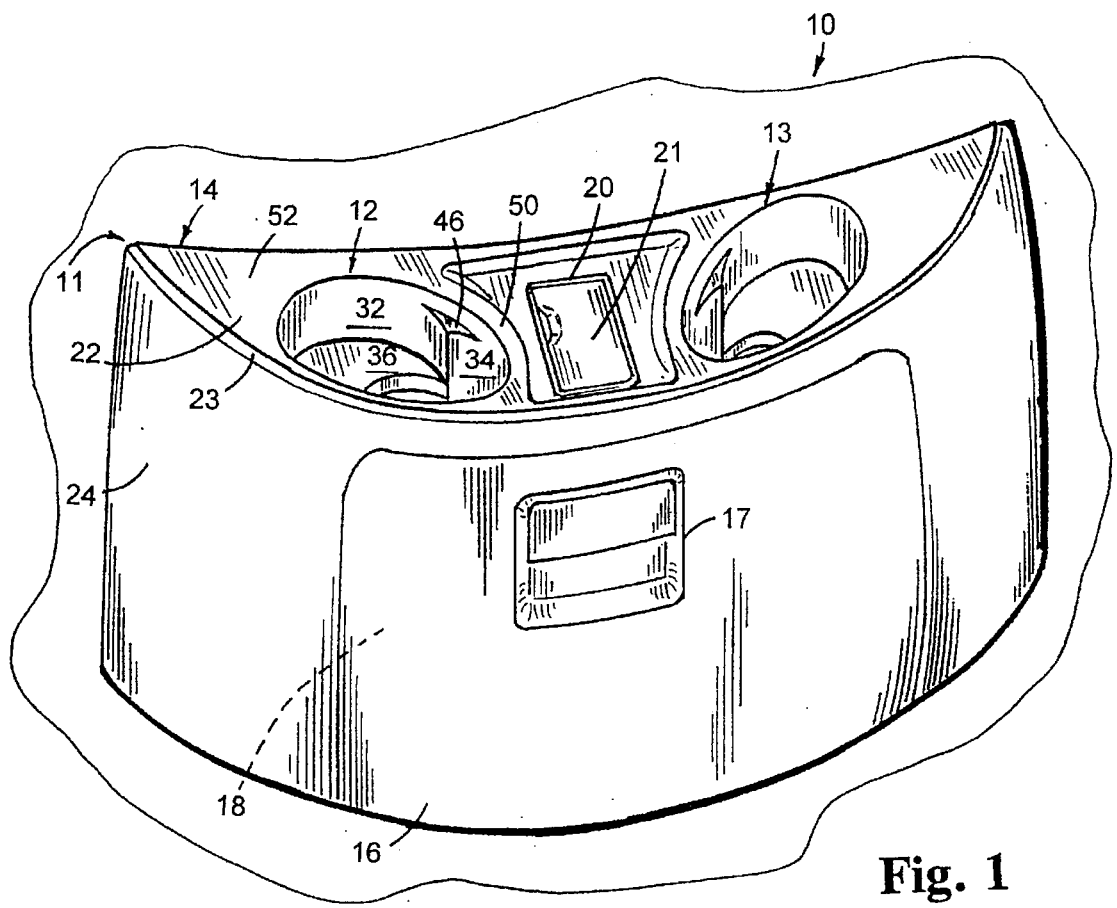
FIG. 1 is a fragmentary, perspective view of a vehicle and a console including a pair of container holders each embodying the present invention.

Referring initially to FIG. 1, there is shown a vehicle 10, such as an automobile or van, which includes a center floor console 11. Console 11 includes a pair of container holders 12 and 13 embodying the present invention and formed in a housing 14. The console 11 is configured to cover the passenger compartment side of an engine compartment between and in front of the front vehicle seats of a van. However, it is contemplated that the container holder 12 can be located in various vehicles and structures such as armrests, floor consoles, door panels, and the like. Various functional features and compartments can be incorporated into or attached to support 14, such as pivot-out door 16 with latch 17 forming a storage compartment 18, and a covered ashtray 20 having a pivotally closeable cover 21.

Support 14 includes a generally flat horizontally extending upper surface 22, and an integrally molded contoured front surface 24 extending downwardly from the curvilinear front edge 23 of upper surface 22. Container holder 12 is a mirror image of container holder 13, and thus only container holder 12 will be described.

Figure 2:
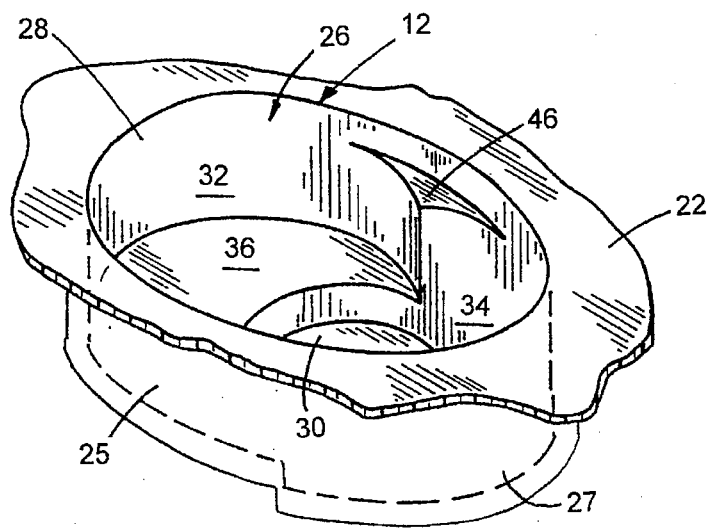
FIG. 2 is an enlarged fragmentary perspective view of one of the container holders shown in FIG. 1.
Figure 6:
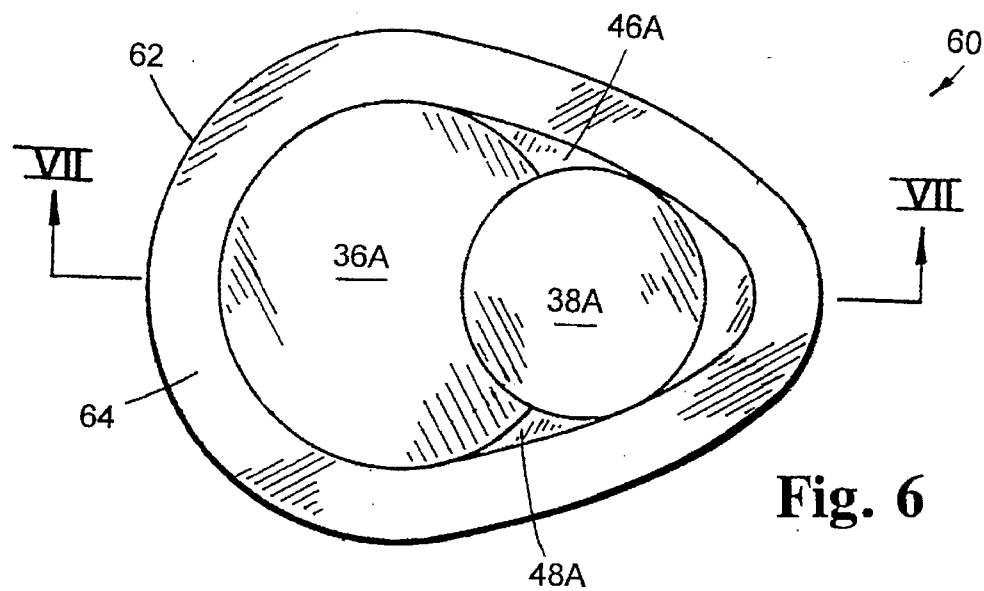
FIG. 6 is a top plan view of the container holder shown in FIG. 5.
Figure 7:
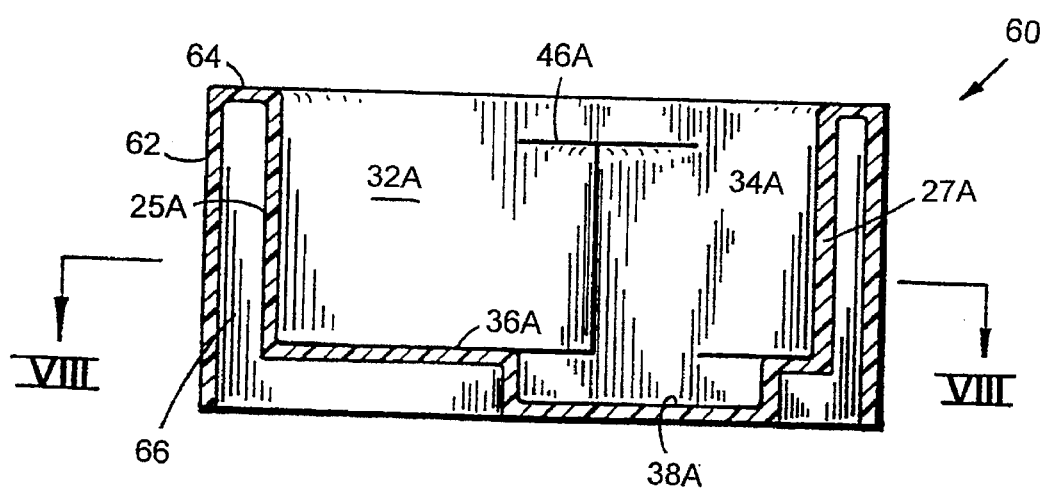
FIG. 7 is a cross-sectional view taken along section line VII—VII in FIG. 6.
Figure 8:
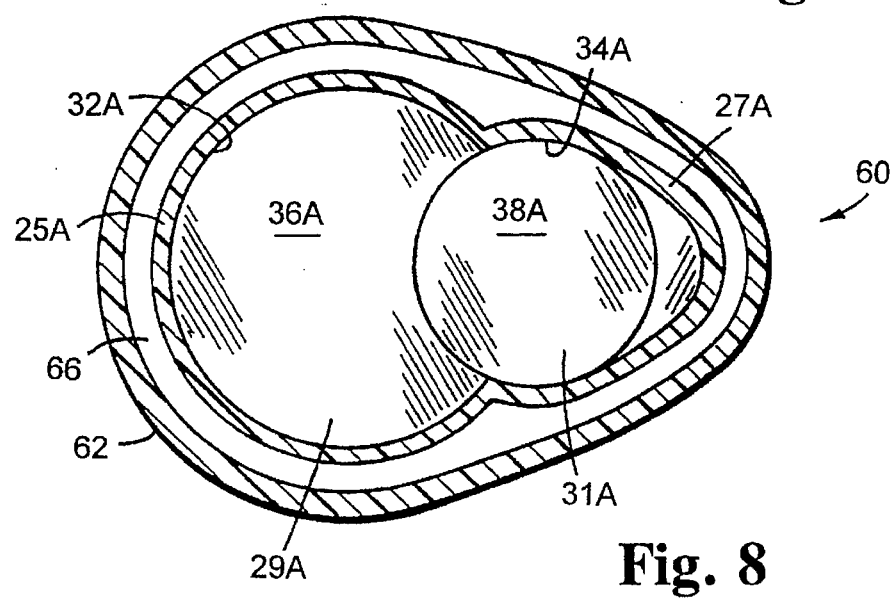
FIG. 8 is a cross section taken along section line VIII—VIII in FIG. 7.

Container holder 12 (FIGS. 2–4) is defined by a downwardly formed recess 26 integrally molded into surface 22. Recess 26 has sidewalls 25 and 27 that define a pair of offset and overlapping cylindrically-shaped recesses 28 and 30. The first recess 28 has a relatively large diameter and a short depth for supporting a coffee mug 40 having a handle 42 shown in phantom in FIG. 3. The second recess 30 has a relatively smaller diameter and is deeper for supporting a soda can or Styrofoam coffee cup. In particular, recess 28 is defined by an arcuate sidewall 32 forming a first container holder aperture 29 (FIG. 2), and recess 30 is defined by an arcuate sidewall 34 defining a second container holder aperture 31. A first floor surface 36 is integrally formed in recess 28 while a second floor surface 38 is integrally formed in recess 30. First floor surface 36 is located elevationally above second floor surface 38 so that the coffee mug 40 having a handle 42 can be conveniently positioned in first recess 28 with the handle 42 extending into recess 30. The end 45 of recess 26 adjacent recess 30 extends laterally beyond second recess 30 so that a cup 44 can be grasped on both sides when in second recess 30.

The overlap of container holder apertures 29 and 31 (FIGS. 3–4) prevent container holder 12 from receiving a mug 40 and a coffee cup at the same time. However, the overlap reduces the amount of space occupied by the dual container holder 12, thus conserving space in the vehicle passenger compartment. Further, the overlap also positions recess 30 so that it receives mug handle 42 (FIG. 3) when mug 40 is placed in recess 28. Notably, the raised level of floor 36 above floor 38 (FIG. 4) also positions mug 40 at a more convenient height where the handle 42 is more accessible. Still another feature is that the lower floor surface 38 provides a convenient coin tray that can be used to hold loose coins even when a coffee cup has been placed in recess 30.

The shape of sidewalls 32 and 34 define a vertical plane at their intersection, and form opposing triangular protrusions 46 and 48 at their intersection that project inwardly into recess 26. The projections 46 and 48 are configured to hold the mug 40 in first recess 28 and, separately, to hold a soda can in second recess 30. Also, projections 46 and 48 visually provide a break to sidewalls 32 and 34, thus making them more aesthetically pleasing for many vehicle interiors. Additionally, the larger recess 28 is located in a larger surface area 52 (FIG. 1) located near the rear edge of upper surface 22, while the smaller recess 30 is located in a narrower area 50 of upper surface 22. This arrangement conserves space, and also allows container holder 12 to be located in an area that is too small to accept two separate recesses having the size of recesses 28 and 30.

A modified container holder 60 (FIGS. 5–8) embodying the present invention includes an oblong structure forming a recess 26A identical to recess 26. In container holder 60, identical and similar features are identified with identical numbers but with the addition of the letter "A". An oblong ring-shaped wall 62 extends around sidewalls 25A and 27A and is spaced therefrom. An upper wall section 64 interconnects walls 25A and 27A to ring-shaped wall 62. The walls 25A, 27A and 62 are sufficiently thin to facilitate molding. The space 66 between walls 62 and 25A and 27A also allows container holder 60 to be supported on a hook (not shown) extending from a vertical support in a vehicle such as a door or the instrument panel. Alternatively, a bottom mounting plate can be added to cover the bottom of container holder 60 for mounting to a tray or other vehicle supporting surface for conveniently mounting the container holder 60. In both embodiments, the container holder can be integrally molded of a suitable polymeric material such as polycarbonate A.B.S. or the like.

Thus, a container holder is provided that defines a pair of overlapping offset apertures for receiving containers of different sizes. From the foregoing description, it will be readily appreciated by those skilled in the art that modifications may be made to the invention without departing from the concepts disclosed herein. Accordingly, such modifications are to be considered as covered by the following claims.

The embodiments of the invention in which an exclusive property or privilege is claimed are defined as follows:

1. A container holder for a vehicle comprising:
  a support including an upper surface and side surfaces defining a recess in said upper surface, and further including a floor surface defining a bottom of the recess; said side surfaces including a first side surface defining a first container holder aperture and a second side surface defining a second container holder aperture having a diameter different than the first container holder aperture, said first and second container holder apertures offset and overlapping so that one of said container holder apertures provides space for receiving a handle on a container placed in the other of said container holder apertures, said support further including at least one protrusion extending into said recess between said first and second container holder apertures for partially subdividing the recess and stably supporting a container placed in either one of the first or second container holder apertures.

2. A container holder as defined in claim 1 wherein said upper surface includes a larger area and a smaller area, said first container holder aperture being located in said larger area and having a larger diameter, and said second container holder aperture being located in said smaller area and having a smaller diameter.

3. A container holder as defined in claim 1 wherein said floor and said side surfaces are connected and continuous such that said recess is adapted to retain spilled fluids up to a height of said upper surface.

4. A container holder as defined in claim 1 wherein said floor surface includes a first floor surface located under said first container holder aperture and a second floor surface located under said second container holder aperture, said first and second floor surfaces being non-coplanar.

5. A container holder as defined in claim 4 wherein said first container holder aperture has a larger diameter than said second container holder aperture, and said first floor surface is located closer to said upper surface than said second floor surface.

6. A console for a vehicle comprising:
  a support including an upper surface defining a spaced apart pair of container holders each having side surfaces defining a recess in said upper surface; said side surfaces each including a first side surface defining a first container holder aperture and a second side surface defining a second container holder aperture, said first and second container holder apertures offset and overlapping so that one of said container holder apertures provides space for receiving a handle on a container placed in the other of said container holder apertures, said support further including at least protrusion extending into said recess between said first and second container holder apertures for partially subdividing the recess and stably supporting a container placed in either one of the first or second container holder apertures; and
  an ashtray located between said spaced apart pair of container holders.

7. A dual container holder for a vehicle comprising:
  a support including an upper surface and a recess defined in said upper surface, said recess including a first side surface and a first floor defining a first container holder and further including a second side surface and a second floor defining a second container holder, said first container holder having a first diameter and said second container holder having a second smaller diameter, said first and second floor surfaces being non-coplanar and said first floor surface being located closer to said upper surface than said second floor surface such that said first and second container holders will stably support containers of at least two different diameters, said first and second side surfaces defining generally triangular-shaped protrusions extending toward a common space occupied by both said first and second container holders.

8. A container holder comprising:
  a housing including an upper surface and a first integrally formed generally cylindrical downwardly extending support for holding a first container and a second integrally formed generally cylindrical downwardly extending support for holding a second container, said first support being deeper than said second support and said first and second supports overlapping such that only one of the first and second containers can be held in the first and second supports at one time, said first and second supports including generally triangular protrusions extending toward a common space occupied by both said first and second supports.

9. A console including the container holder defined in claim 8.

10. A container holder as defined in claim 8 wherein said first and second supports have different diameters.

11. A container holder as defined in claim 10 wherein said first support includes a first floor and said second support includes a second floor having a plane offset from the plane of said first floor.

* * * * *